United States Patent Office
3,062,902
Patented Nov. 6, 1962

3,062,902
NITROSYL FLUORIDE AS A FLUORINATING AGENT
Louis G. Anello, Parsippany, and Joseph Gordon and Cyril Woolf, Morristown, N.J., assignors to Allied Chemical Corporation, New York, N.Y., a corporation of New York
No Drawing. Filed Dec. 23, 1960, Ser. No. 77,809
11 Claims. (Cl. 260—653.8)

This invention relates to processes for fluorinating aliphatic halocarbons.

In accordance with the invention it has been found that certain aliphatic halocarbons may be reacted conveniently in gas phase with a nitrosyl fluoride material fluorinating agent of the group consisting of nitrosyl fluoride, NOF, a nitrosyl fluoride-hydrogen fluoride complex, namely NOF.3HF, or mixtures of both, to form fluorinated or more highly fluorinated aliphatic carbon compounds. A major factor of the invention lies in the discovery of the fluorinating properties of the indicated fluorinating agents with regard to the fluorination of certain aliphatic halocarbon starting materials containing at least one atom of a halogen other than fluorine, especially aliphatic halocarbons containing hydrogen and at least one atom of a halogen other than fluorine, to effect metathetical exchange of organically bound non-fluorine halogen of the starting material for fluorine contained in the fluorinating agent. The conventional fluorinating agent in the chlorofluorocarbon art is anhydrous hydrogen fluoride, and most processes utilizing anhydrous HF as fluorinating agent require catalytic promotion. In most instances, in hydrogen fluoride fluorinating reactions, whether catalyzed or not, the HF usually acts indiscriminately with respect to substitution of fluorine for hydrogen and halogen other than fluorine initially contained in the starting material, and hence HF is not regarded generally as a selective fluorinating agent.

The NOF per se, NOF.3HF complex or mixtures of both are powerful fluorinating agents, much more so than anhydrous HF and not much less so than the most powerful known fluorinating agents such as elemental fluorine, fluorine halides and cobaltic fluoride. Agents of the latter group of fluorinators are characterized by non-selectivity with regard to replacement of hydrogen and halogen other than fluorine contained in a starting material. In accordance with this invention, it has been found that, notwithstanding the high fluorinating potentials of the fluorinating agents of the invention, such agents are selective as to effecting metathetical exchange of fluorine of the fluorinating agent for organically bound non-fluorine halogen of the material to be fluorinated, and do not effect any appreciable attack on the hydrogen content of a given aliphatic halocarbon starting material containing hydrogen and at least one halogen other than fluorine. The advantages provided by high fluorinating potency plus the selectivity stated are self-evident, particularly in those phases of commercial operations in which the logical and economical route to a fluorinated end product containing hydrogen would be by direct one-step fluorination of a partially halogenated starting material containing the same number of hydrogen atoms. It has been found further that the fluorinating agents of the invention function as herein described without the use of a catalyst, which factor affords obvious operating advantages not only with respect to use of starting materials containing hydrogen but also as to use of completely halogenated starting materials, i.e. completely halogenated but containing at least one halogen atom other than fluorine.

Reactions involved in practice of typical embodiments of the invention may be represented by—

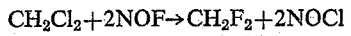
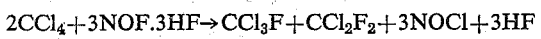

Nitrosyl fluoride, NOF, is a known and available normally colorless gas material having a boiling point of about minus 56° C. Nitrosyl fluoride may be made, as known, by passing nitrosyl chloride over silver fluoride in a platinum tube at elevated temperatures, or by direct reaction of nitric oxide and elemental fluorine. The nitroso fluoride-hydrogen fluoride complex, NOF.3HF, utilized as a reactant in accordance with the present invention, may be made by reaction of nitrosyl chloride and anhydrous HF, for example as follows.

The reactor employed was an unpacked nickel tube 1" I.D. x 36" long mounted in an electrically heated furnace 30" long. Throughout the run, the reactor was heated to about 60° C. During a period of about 4 hours, a vaporous mixture consisting of about 11.3 mols (226 g.) of HF and about 1.82 mols (118 g.) of NOCl was passed into the reactor. Ratio of HF to NOCl was about 6 to 1, and reaction contact time was about 18 sec. Products exiting the reactor were passed into the bottom of a 1 inch by 2 foot vertically disposed nickel still packed with nickel "Heliopak," and provided at the top with a reflux condenser cooled by Dry Ice-acetone mixture. The HCl formed passed through the reflux and was absorbed by a water scrubber located after the still. All other materials exiting the reactor were condensed and held in the still during the run. On completion of the run, the condensate thus collected was distilled and there were recovered about 45 gms. (0.69 mol.) of a fraction boiling in the range of minus 5 to zero degrees C. and comprising mostly NOCl; about 86 gms. (4.3 mols.) of a fraction boiling in the range of 17–20° C. and comprising mostly HF; about 60 gms. of a fraction boiling in the range of 63–69° C.; and about 96 gms. of a pot residue boiling above about 70° C. The 63–69° C. fraction was redistilled and had a boiling point of about 68° C., and was liquid NOF.6HF complex. The pot residue fraction on redistillation showed a boiling point of about 95° C., and was liquid NOF.3HF complex. The NOF.6HF complex pyrolyzes at about 77–81° C. to HF and NOF.3HF complex. Hence, the mixture collected in the still after refluxing and at completion of the run as noted above, may be converted wholly to the NOF.3HF complex by heating to say 90° C. Further, it will be understood that when the material is heated sufficiently to convert all of the same to vaporous form, all complex of the vapor is the NOF.3HF, i.e. at temperature above 95° C. (atmospheric pressure), all of the complex exists as NOF.3HF.

Nitrosyl fluoride is ordinarily available in gas form. The NOF.3HF complex is usually initially in the form of a liquid which, if all NOF.3HF complex, boils at about 95° C. However, the NOF.3HF complex may be initially available in the form of a mixture of NOF.3HF and NOF.6HF, as above described, and at temperature of say 90° C. and up all NOF.6HF complex becomes converted to the NOF.3HF complex, so that in practice of the present invention, the nitrogen-oxygen-fluorine compound fed in vapor form is all the NOF.3HF complex.

Starting materials which may be employed in practice of the invention are saturated or unsaturated halogenated straight chain lower aliphatic hydrocarbon compounds, preferably those containing a maximum of four carbon atoms, and having at least one halogen atom other than fluorine, i.e. at least one halogen atom having an atomic number higher than nine. In the better embodiments, starting materials have one or two carbon atoms, at least one halogen atom other than fluorine, and more desirably starting materials are those containing, in addition to at least one halogen atom other than fluorine, at least one hydrogen atom. In the best embodiments, starting materials are saturated or unsaturated halogenated aliphatic hydrocarbons having one or two carbon atoms and containing at least one chlorine atom, at least one hydrogen atom, all other constituents being of the group consisting of fluorine, chlorine and hydrogen. Thus broadly, aside from the requirement of at least one halogen atom (preferably chlorine) other than fluorine, the starting materials may be completely halogenated and may contain some fluorine. One or two carbon atom halogenated aliphatic hydrocarbons containing at least one hydrogen atom and at least one halogen atom other than fluorine which may be employed as starting material in accordance with the invention include: $CH_2FCl$, $CHFCl_2$, $CH_2Cl_2$, $CH_2Br_2$, $$CHBr_3, CHCl_3, CHBr=CBr_2, CHCl_2CF_3$$

$$CHF_2CCl_3, \text{ and } CHF_2CHCl_2$$

Compounds containing no hydrogen, which may be used as starting materials may include: $CCl_3CCl_3$, $CCl_3CCl_2F$, $CCl_2FCCl_2F$, $CClF_2CF_3$, $CCl_3CF_3$, $CF_3CBr_3CCl_4$, $CBrCl_3$, $CFCl_3$ and $CFBr_3$. Three and four carbon atom compounds which may be used as starting materials may include: $CCl_2=CClCCl_3$, $CCl_2=CClCFCl_2$, $$CH_3CH_2CFCl_2, CCl_2FCH_2CCl_3, CH_2=CHCCl_3$$

$$CCl_3CFClCCl_3, \text{ and } CCl_3CCl=CHCH_3$$

$$CCl_3CH=CHCCl_2F, CCl_3CCl_2CH_2CF_3$$

$$CCl_3CFClCFClCCl_3, \text{ and } CF_3CCl=CClCCl_3$$

General practice of the invention process comprises introducing into a reaction zone a described starting material in gas phase and gaseous fluorinating agent of the group consisting of NOF and NOF.3HF complex, heating such starting material and the fluorinating agent in the reaction zone to certain elevated temperatures and for a time sufficient to effect fluorination of a substantial amount of the starting material, and discharging from the reaction zone reaction products containing fluorinated aliphatic hydrocarbon containing more fluorine than the initial starting material. The process may be carried out by continuously passing metered quantities of starting material, and NOF or NOF.3HF or mixtures of both, into and thru a suitable tubular reactor mounted in an electrically heated furnace and connected to a product recovery system. The reactor and other equipment may be made of nickel, Monel or Inconel, or other material corrosive-resistant to reactants and products formed. In the preferred embodiments, the reactor is unpacked and no catalyst is employed.

Significant reaction may proceed at temperatures as low as about 250° C. Although temperatures higher than about 650° C. do not appear to substantially adversely affect reaction, temperatures above 650° C. afford no substantial advantage. Experience shows that for best results, temperatures substantially in the range of 325–625° C. are preferred.

While sub- or super-atmospheric pressures may be employed, the invention affords the advantage of operation at substantially atmospheric pressure. It will be understood that in the practice of gas-phase processes of the general type described herein, i.e. processes in which a gas stream is flowed successively thru reaction and product recovery systems, for all practical purposes, as relate to reactions themselves, pressure is considered as being substantially atmospheric. Technically, however, pressures in such systems are sufficiently on the positive side to effect commercially satisfactory gas flow thru the apparatus train. Thus, strictly speaking, depending upon factors such as apparatus design, unpacked gas space in the reactor, desired contact time, etc., actual pressures in systems of the kind under consideration may vary from 2 up to say 10–15 pounds gauge, and accordingly operations of this type are included in the designation of substantially atmospheric pressure.

With regard to ratios of fluorinating agent to starting material, whether the fluorinating agent is NOF or the NOF.3HF complex, theoretical requirements are believed to be approximately one mol of fluorinating agent (basis, NOF constituent) per atom of halogen other than fluorine in the starting material. Experience indicates that fluorinating agent to starting material ratios may vary rather widely, and in this connection ratio of mols of NOF constituent of the fluorinating agent per atom of halogen other than fluorine in the starting material advantageously may lie in the range of about 0.3:1 to 4:1. It has been found that notably good results may be obtained when reactor feed is regulated so as to charge into the reaction zone quantities of starting material and fluorinating agent such as to provide a ratio of mols of NOF constituent of the fluorinating agent per atom of halogen other than fluorine in the starting material substantially in the preferred range of 0.5:1 to 3:1.

Contact time may be varied considerably without noticeable disadvantage to high process efficiency. Generally, increasing contact time and reactor temperature results in higher reactivity. Significant conversions are effected at contact times as short as one second. However, contact times usually may lie in the range of 2–200 seconds, preferably 2–60 seconds. To a substantial extent, contact time, reactor temperature and ratio of reactants are interrelated, and depending upon apparatus and the particular operation at hand, optimum conditions as to contact time may be determined by test runs.

Product recovery may be effected by techniques more or less conventional in this art. The reactor exit contains sought-for product, and may contain, in addition to unreacted organic starting material, NOX by-product (X is a halogen other than fluorine) e.g. NOCl, unreacted NOF or NOF.3HF, and HF. The reactor exit may be run into an aqueous dilute caustic (Na or K) scrubbing solution which extracts halogen acid from the gas stream and also effects removal from the gas stream of nitrosyl halide as alkali metal chloride and nitrite, and as water. Gaseous exit of the scrubber may be dried by a dessicant such as Drierite or calcium chloride. Alternatively, a water scrubber may be used between the reactor and the caustic scrubber, although such procedure is not preferred since some non-condensable NO is formed in the water scrubber in the absence of caustic. In the case of either scrubbing system, system, all unreacted NOF and all NOCl reaction by-products are removed in one way or another from the gas stream in the scrubber, and the exit gas stream of the scrubbing system contains nothing but sought-for products and unreacted starting materials which are gaseous at the exit temperature of the scrubber system, plus possibly some gaseous oxide of nitrogen resulting from decomposition of NOF and NOCl in the scrubber system. After drying, the dried gas stream then may be fed into a cold trap and refrigerated as by a minus 78° C. Dry Ice-acetone mixture. Condensate in the trap may then be suitably fractionally distilled to recover sought-for product in substantially pure form. In some instances, some relatively high boiling unreacted starting material and/or sought-for product may be condensed out in the scrubbing system. Such product may be recovered by known technique from the scrubbing liquor and combined with the cold trap condensate for ultimate recovery.

The following illustrate practice of the invention.

*Example 1.*—The reactor employed consisted of a 1" I.D. 12" long nickel tube mounted in an electrically heated furnace enveloping substantially the length of the reactor. The latter was unpacked and no catalyst was employed. The reactor was provided at one end with valved inlets arranged to facilitate separately metered feed of CCl₄ and NOF, both in gas form. The opposite end of the reactor had a gas outlet connected to a caustic potash scrubber. Vaporous CCl₄ was metered into the reactor at a rate of about 0.5 mol/hr., and simultaneously NOF gas was charged into the reactor at a rate in the range of 1.5 to 2.0 mols/hr., thus providing a ratio of mols of NOF per atom of chlorine in the CCl₄ in the range of about 0.75:1 to about 1:1. Throughout the run extending for about one hour, temperature in the reactor was maintained at about 375° C., and contact time was about 11–12 seconds. Products discharged from the reactor were passed into a scrubber containing an aqueous 10% KOH solution. In the scrubber, unreacted NOF was removed from the gas stream as KF and KNO₂ (both water soluble) and as water; and NOCl reaction by-product was removed from the gas stream as water soluble KCl and KNO₂. The exit of the KOH scrubber was passed thru a water scrubber, the bubbling in which indicated passage thru the scrubber of a product in gas form. The gas stream was then dried by passage thru a CaCl₂ tower. The dried gas stream was run into a cold trap cooled to about minus 78° C. by a Dry Ice-acetone mixture. All constituents of the gas stream, except trace oxides of nitrogen, were totally condensed. Infrared absorption spectrum and gas chromatography analysis showed that both the gas stream entering the cold trap and the condensate recovered therein, aside from some unreacted CCl₄, comprised CCl₂F₂ and CCl₃F.

*Example 2.*—Apparatus and procedure employed were substantially the same as in Example 1. Over a period of about 3 hrs. gaseous CCl₄ was charged into the reactor at a rate of about 0.23 mol/hr., and gaseous NOF was simultaneously introduced into the reactor at a rate of about 0.33 mol/hr., thus providing a ratio of mols of NOF per atom of chlorine in the CCl₄ of about 0.36:1. Throughout the run, temperature in the reactor was maintained substantially in the range of 570–600° C., and contact time was about 38–40 seconds. Products leaving the reactor were handled as in Example 1, and after drying, the gas stream, with the exception of trace oxides of nitrogen, was totally condensed in the cold trap. At the end of the run, the caustic potash scrubber contained 0.6 mol of Cl⁻, indicating an 87% conversion of the CCl₄ charged. Infrared absorption spectrum and gas chromatography analysis showed the cold trap condensate and the dried uncondensed gas stream to be dominantly CCl₃F plus some CCl₂F₂.

*Example 3.*—Apparatus, procedure, and all operations were the same as in Example 1 except that the organic starting material employed was CH₂Cl₂ instead of the CCl₄ of Example 1, and the reactants fed provided a ratio of mols of NOF per atom of chlorine in the CH₂Cl₂ in the range of about 1.5:1 to 2:1. Infrared absorption spectrum and gas chromatography analysis of the gas stream after drying showed the same to comprise CH₂F₂ and CH₂FCl.

*Example 4.*—The reactor employed consisted of a 1″ I.D. 36″ long nickel tube mounted in an electrically heated furnace enveloping substantially the length of the reactor. The latter was unpacked and no catalyst was employed. The reactor was provided at one end with valved inlets arranged to facilitate separately metered feed of tetrachloroethylene and NOF.3HF complex, both in gas form. The opposite end of the reactor had a gas outlet connected to a water scrubber. Nitrosyl fluoride-hydrogen fluoride complex, made as above described, was vaporized and the resulting NOF.3HF vapor and vaporized CCl₂=CCl₂ were charged into the reactor. Throughout the run, temperature in the reactor was maintained at about 600° C. Contact time was about 12 seconds. Products discharged from the reactor were passed thru a water scrubber to remove HF, HCl, NOCl and NOF.3HF. The water scrubber exit, containing some NO, was passed into and thru a 10% caustic potash solution to remove residual acidity from the gas stream as KF, KNO₂ and KCl. Unreacted CCl₂=CCl₂ and some CCl₂=CClF condensed out in the scrubbers. The caustic scrubber exit was dried, and the dried gas stream, containing CCl₂=CClF swept along by NO, was run into a cold trap cooled by Dry Ice-acetone mixture. All constituents of the gas stream, except NO and trace amounts of other oxides of nitrogen, were totally condensed. Infrared absorption spectrum and gas chromatography analysis of the gas stream entering the cold trap showed the same to comprise mostly CCl₂=CClF.

The herein outlined method for making NOF.3HF and NOF.6HF complexes, from nitrosyl chloride and HF, is more fully described and claimed in Anello and Woolf copending application Serial No. 77,805, filed December 23, 1960.

We claim:

1. The process for effecting fluorination of a halogenated straight chain lower aliphatic hydrocarbon starting material containing at least one halogen atom other than fluorine, which process comprises introducing into a reaction zone said starting material in gas phase and gaseous fluorinating agent of the group consisting of NOF and NOF.3HF complex, heating said starting material and said fluorinating agent in said zone to temperatures substantially in the range of 250–650° C. and for a time sufficient to effect fluorination of substantial amount of said starting material, and discharging from said zone reaction products containing fluorinated aliphatic hydrocarbon compound containing more fluorine than said starting material.

2. The process for effecting fluorination of a halogenated straight chain lower aliphatic hydrocarbon starting material and containing at least one chlorine atom, at least one hydrogen atom, and all other constituents being of the group consisting of fluorine, chlorine and hydrogen, which process comprises introducing into a reaction zone said starting material in gas phase and gaseous fluorinating agent of the group consisting of NOF and NOF.3HF complex, heating said starting material and said fluorinating agent in said zone to temperatures substantially in the range of 250–650° C., and for a time sufficient to effect fluorination of substantial amount of said starting material, and discharging from said zone reaction products containing fluorinated aliphatic hydrocarbon compound containing at least one hydrogen atom and more fluorine than said starting material.

3. The process for effecting fluorination of a halogenated aliphatic hydrocarbon starting material having not more than two carbon atoms and containing at least one halogen atom other than fluorine, which process comprises introducing into a reaction zone said starting material in gas phase and gaseous fluorinating agent of the group consisting of NOF and NOF.3HF complex, heating said starting material and said fluorinating agent in said zone to temperatures substantially in the range of 250–650° C. and for a time sufficient to effect fluorination of substantial amount of said starting material, and discharging from said zone reaction products containing fluorinated aliphatic hydrocarbon having not more than two carbon atoms and containing more fluorine than said starting material.

4. The process of claim 3 in which temperature is substantially in the range of 325–625° C.

5. The process of claim 3 in which the ratio of mols of NOF constituent of the fluorinating agent per mol of halogen other than fluorine in the starting material is substantially in the range of 0.3:1 to 4:1.

6. The process of claim 3 in which the said starting material contains at least one hydrogen atom, and the fluorinated aliphatic hydrocarbon discharged from the reaction zone contains at least one hydrogen atom.

7. The process for effecting fluorination of a halogenated aliphatic hydrocarbon starting material having not more than two carbon atoms and containing at least one chlorine atom, at least one hydrogen atom, and all other constituents being of the group consisting of fluorine, chlorine and hydrogen, which process comprises introducing into a reaction zone said starting material in gas phase and gaseous fluorinating agent of the group consisting of NOF and NOF.3HF complex, heating said starting material and said fluorinating agent in said zone to temperatures substantially in the range of 250–650° C., and for a time sufficient to effect fluorination of substantial amount of said starting material, and discharging from said zone reaction products containing fluorinated aliphatic hydrocarbon having not more than two carbon atoms and containing at least one hydrogen atom and more fluorine than said starting material.

8. The process of claim 7 in which temperature is substantially in the range of 325–625° C.

9. The process of claim 7 in which the ratio of mols of NOF constituent of the fluorinating agent per atom of chlorine in the starting material is substantially in the range of 0.3:1 to 4:1.

10. The process of claim 7 in which the starting material is $CH_2Cl_2$, and the fluorinated aliphatic hydrocarbon material discharged from the reaction zone includes $CH_2F_2$ and $CH_2ClF$.

11. The process for effecting fluorination of a halogenated aliphatic hydrocarbon starting material having not more than two carbon atoms and containing at least one chlorine atom, at least one hydrogen atom, and all other constituents being of the group consisting of fluorine, chlorine and hydrogen, which process comprises introducing into a reaction zone said starting material in gas phase and gaseous fluorinating agent of the group consisting of NOF and NOF.3HF complex, regulating quantities of starting material and fluorinating agent charged to provide in said zone a ratio of mols of NOF constituent of the fluorinating agent per atom of chlorine in the starting material substantially in the range of 0.5:1 to 3:1, heating said starting material and said fluorinating agent in said zone to temperatures substantially in the range of 325–625° C. and for a time sufficient to effect fluorination of substantial amount of said starting material, discharging from said zone reaction products containing fluorinated aliphatic hydrocarbon having not more than two carbon atoms and containing as much hydrogen as said starting material and more fluorine than said starting material.

References Cited in the file of this patent

UNITED STATES PATENTS 2,152,357     Moyer _____ Mar. 28, 1939

FOREIGN PATENTS 770,618     Great Britain _____ Mar. 20, 1957